(12) United States Patent
Abernathy

(10) Patent No.: US 11,724,645 B1
(45) Date of Patent: Aug. 15, 2023

(54) PASSENGER SAFETY SYSTEM

(71) Applicant: Paul Abernathy, Hot Springs, AR (US)

(72) Inventor: Paul Abernathy, Hot Springs, AR (US)

( * ) Notice: Subject to any disclaimer, the term of this patent is extended or adjusted under 35 U.S.C. 154(b) by 0 days.

(21) Appl. No.: 17/405,335

(22) Filed: Aug. 18, 2021

(51) Int. Cl.
  *G08G 1/16* (2006.01)
  *B60Q 9/00* (2006.01)
  *H04N 7/18* (2006.01)

(52) U.S. Cl.
  CPC ............ *B60Q 9/008* (2013.01); *G08G 1/166* (2013.01); *H04N 7/181* (2013.01); *H04N 7/188* (2013.01)

(58) Field of Classification Search
  None
  See application file for complete search history.

(56) References Cited

U.S. PATENT DOCUMENTS

| | | | | |
|---|---|---|---|---|
| 7,002,109 | B2 * | 2/2006 | Klask | H05B 3/683 340/500 |
| 9,908,470 | B1 * | 3/2018 | Englander | G01S 13/86 |
| 2006/0170548 | A1 * | 8/2006 | Leen | G08B 13/19 340/545.2 |
| 2008/0046150 | A1 * | 2/2008 | Breed | B60R 21/0134 701/45 |
| 2010/0188229 | A1 * | 7/2010 | Nhep | F24C 7/08 340/638 |
| 2016/0343256 | A1 * | 11/2016 | Song | H04W 4/029 |
| 2018/0032824 | A1 * | 2/2018 | Yamamoto | G01S 15/931 |
| 2019/0016346 | A1 * | 1/2019 | Park | G05D 1/0088 |
| 2019/0039608 | A1 * | 2/2019 | Song | B60L 3/0023 |
| 2019/0211587 | A1 * | 7/2019 | Ganeshan | E05B 77/14 |
| 2019/0265703 | A1 * | 8/2019 | Hicok | G05D 1/0088 |
| 2020/0094735 | A1 * | 3/2020 | Darnaud | G08G 1/0141 |
| 2021/0201861 | A1 * | 7/2021 | Morishige | H04R 1/028 |
| 2021/0287546 | A1 * | 9/2021 | Englander | B60Q 5/006 |
| 2022/0381896 | A1 * | 12/2022 | Santavicca | G01S 13/56 |

* cited by examiner

*Primary Examiner* — Muhammad Adnan
(74) *Attorney, Agent, or Firm* — Joe D. Calhoun

(57) ABSTRACT

A system warning the driver of a mass transit vehicle that at least one pedestrian is within an injury risk zone adjacent the mass transit vehicle. The system includes a vibration generator in or on the driver's seat of the mass transit vehicle, functionally associated with a motion sensor and an associated timer commencing sensing of pedestrian motion toward the vehicle for a predetermined duration immediately after the boarding door has been closed in preparation for departure from the boarding zone. Any such pedestrian motion toward the vehicle sensed by the motion sensor within a first risk zone adjacent the vehicle stimulates the first vibration generator to generate a first tactile signaling output perceptible by the driver sitting on the driver's seat for notification of the pedestrian motion in the first risk zone. The vibratory notification may be combined with motion-stimulated visual warning output on a monitor and/or auditory alarm output on a speaker. A plurality of different risk zones can be monitored by different sets of vibration generators, motion detectors, visual stimulus warning outputs (on a split-screen monitor) and/or sound generators for auditory alarm outputs. The system can also function in cooperation with existing safety systems such as warning lights, pedestrian crossing arms, pivot-out stop signs; of the system can include enhanced lighting such as predominantly downwardly directed flood lights mounted on the vehicle below the driver's eyesight (to prevent glare).

6 Claims, 7 Drawing Sheets

PASSENGER SAFETY SYSTEM

CROSS REFERENCE TO RELATED APPLICATIONS

Not applicable.

FEDERALLY SPONSORED RESEARCH AND DEVELOPMENT

Not applicable.

MICROFICHE APPENDIX

Not applicable.

BACKGROUND OF THE INVENTION

(1) Field of the Invention

The present invention relates to systems for assuring the safety of people leaving or approaching a mass transit vehicle. More particularly, the invention disclosed herein relates to systems of sensors and signals notifying the driver that a departing passenger is within the risk zone of the bus, or that an approaching pedestrian is within the risk zone of the bus.

(2) Background of the Invention

Known in the prior art are safety systems comprising sensor-activated lighting, and/or physical barriers (such as pivot-down gate-arms), and/or sounds (such as recorded verbal warnings or repeating beep-beeps), and/or camera-captured images.

For example, U.S. Pat. No. 3,838,392 issued to Lockwood (entitled Audible Warning System for School Buses) discloses an audible warning system that is automatically activated in response to closing of the door of the bus, in preparation for departure; the sound warning lasts for a time period sufficient to warn approaching pedestrians away from the bus until it is safely on its way.

U.S. Pat. No. 8,182,125 issued to Englander (entitled External Safety Illumination for a Bus with Light Mounted Mirror Arm) discloses a light source mounted directly on (or within) the mirror mounting arm, and focused downward to illuminate the ground for the bus driver or camera. The light source may sweep the ground back and forth or be directed under the control of the driver, and it may be activated automatically when movement is detected near the vehicle; door opening or closing may also trigger the light source. The lighting will turn off after a lapse of a set (or user-adjustable) time period after the triggering event.

U.S. Pat. No. 10,311,693 issued to Lee (entitled Vehicle, and a method for controlling the same) discloses a safety system that informs a driver whether a passenger remains in a vehicle when the vehicle is parked. Sensors count persons entering and exiting the bus door(s) upon opening and closing; at the end of the day or route, if the number of entries exceeds the number of exits, the system generates a first signal that a rider may still be aboard the vehicle. A motion sensor will provide a second confirmation that a rider may still be aboard the vehicle. If so confirmed, a sound alarm and/or a visible warning may be generated for the driver, to deal with the remaining passenger(s).

U.S. Pat. No. 10,486,592 issued to Irby (entitled Pedestrian Detection System) discloses a door-opening activated crossing arm system including motion sensors, video cameras, an auditory alarm and an in-vehicle display monitor, for detecting movement of children in proximity to a school bus.

Citation or identification of any reference in this application shall not be construed as an admission that such reference is available as prior art to the present disclosure. And to the extent that section headings are used, they should not be construed as necessarily limiting.

The prior art does not disclose a door-closing activation of motion sensors surrounding the bus, and a timer deactivating all motion sensors and floodlights and cameras at the expiration of a predetermined duration, during which time the sensing of an approaching person will alert the driver by triggering a pedestrian-specific sound alarm, vibrational alarm and flashing visual alarm on a monitor readily viewable by the driver. The invention disclosed herein improves existing passenger safety systems, primarily by adding an extra level of monitoring and notification for the bus driver during the departure and acceleration after a bus stop.

SUMMARY OF THE INVENTION

The invention disclosed herein primary comprises (included) a system warning the driver of a mass transit vehicle that at least one pedestrian is within an injury risk zone adjacent the mass transit vehicle. The system includes a vibration generator (not shown) in or on the driver's seat of the mass transit vehicle, functionally associated with a motion sensor (1) and an associated timer (not shown) commencing sensing of pedestrian motion toward the vehicle for a predetermined duration immediately after the boarding door (21) has been closed in preparation for departure from the boarding zone. Any such pedestrian motion toward the vehicle sensed by the motion sensor within a first risk zone adjacent the vehicle stimulates the first vibration generator to generate a first tactile signaling output perceptible by the driver sitting on the driver's seat for notification of the pedestrian motion in the first risk zone. The vibratory notification may be combined with motion-stimulated visual warning output on a monitor (22) and/or auditory alarm output on a speaker (in the monitor, or a separate speaker). A plurality of different risk zones can be monitored by different sets of vibration generators, motion detectors, visual stimulus warning outputs (on a split-screen monitor) and/or sound generators for auditory alarm outputs. The system can also function in cooperation with existing safety systems such as warning lights, pedestrian crossing arms, pivot-out stop signs; or the system can include enhanced lighting such as predominantly downwardly directed flood lights mounted on the vehicle below the driver's eyesight (to prevent glare).

In general, the system disclosed herein is more than just an updating or improvement of prior art systems. The nature and coordination of several of the changes result in utility synergies exceeding the isolated changes. Traditional lighting has been changed to LED lighting to be more visible in pre-dawn darkness. Examples include the yellow and red warning lighting on the front and back of the bus, from the traditional low-visibility lighting to super bright highly visible LEDs; and alternating flashing of yellow or red lights may likewise be perceived as an "X" pattern. For example, for the four clusters of lights on the top corners and bumper corners on the front or back of a bus, the top left cluster of lights has two horizontal "rows", each "row" being four horizontally-aligned pairs of lights. On the upper row, the first pair (from the left) includes a red light (depicted as more intensely hatched) stacked atop a yellow light (depicted as less intensely hatched). The second pair from the left is just the opposite, with a yellow light stacked atop a red light. The third pair is like the first pair, and the fourth pair is like the second pair. The lower row is the mirror image of the upper row.

An 8-foot long lighted pivoting stop arm (23) with a flashing LED Stop sign (24), that is visible up to half a mile away, was also added. The Stop arm is mounted below a pivot-out stop sign (25) mounted on the driver side near the driver's window. The existing pivoting Stop sign lighting changed from the traditional low light to bright LEDs. The 8-foot lighted stop arm carrying the LED Stop sign will alert oncoming and trailing traffic that passing a stopped school is prohibited and will deter cars from passing while children are boarding and departing. Also added may be a 6-foot pivot-out lighted arm with a Stop sign, on the driver side of the bus (but in the rear), also extending out into the adjacent lane of traffic. Flashing LED lighting was added to the pivot-out arm on the front of the bus near the passenger boarding area. There is additional lightening on the boarding side of the bus, from the back axle to the boarding door steps; there is also additional lighting on the driver side for students having to walk in front of the bus to approach boarding door.

Providing super bright yellow and red highly visible LED lighting in a flashing cross pattern on the front and back of the bus provides higher visibility and more surface area for the oncoming traffic to notice. In one ideal embodiment, the passenger boarding lights, cameras, and motion sensors stay on for 10 to 20 seconds after boarding door closes.

Also added are 4 infrared cameras (one of each side of the rectangular bus), along with 18 motion sensors. The cameras are located on the front and back of the bus and on each mirror looking down the side of the bus. The motion sensors are mounted on the boarding side of the bus, from the back axle to past the boarding door, and on the front of the bus. Preferably, the passenger boarding lights, cameras, and motion sensors stay on for 10 to 20 seconds immediately after the bus resumes forward movement, ideally about 15 seconds.

The cameras stream images to the monitor for viewing by the bus driver, to alert the driver of any pedestrian moving within an area adjacent the bus that is considered a risk zone for being struck by the bus. For example, when a child is running alongside the bus toward the boarding door, the cameras and motion sensors will alert the driver to stop immediately.

A computer processing unit (CPU) could control most of the lighting, motion sensing, and related outputs such as auditory, visual and vibrational warnings. A DVD recorder or similar may be integrated into the system as well, to memorialize what occurs in the surrounding of the bus during that day's use.

One primary benefit of the disclosed invention is to provide a different injury-risk stimulation/notification to the driver, vibrational, that literally shakes the driver as a notification.

Another benefit of the disclosed invention is to provide a pedestrian-specific vibrational notification in addition to any other types of sound alarms of existing systems (that are prone to be "lost" in the din of the environment often existing on mass transit vehicles.

Another benefit of the disclosed invention is to provide a pedestrian-specific vibrational notification in addition to any other types of visual alarms of existing systems, which are not pedestrian-specific.

These and other aspects of the disclosed subject matter, as well as additional novel features, will be apparent from the description provided herein. The intent of this summary is not to be a comprehensive description of the subject matter, but rather to provide a short overview of some of the subject matter's functionality. Other systems, methods, features and advantages herein provided will become apparent to one with skill in the art upon examination of the accompanying Figures and detailed description. It is intended that all such additional systems, methods, features and advantages that are included within this description, be within the scope of any claims filed now or later.

The invention is essentially a coordinated system of alarms to reduce the possibility that a person will be injured by a bus while he or she is approaching or departing the bus. The various subsystems include:
  (a) lights to illuminate areas often involved in such injuries ("Risk Zones"), and to warn pedestrians and nearby automobiles that the bus is taking on or discharging passengers;
  (b) pivoting arms to deter pedestrians from risk zones, and pivoting stop signs or other signage to warn nearby automobiles that the bus is taking on or discharging passengers;
  (c) cameras transmitting images to one or more monitors, to facilitate visual inspection of Risk Zones; and
  (d) motion sensors to detect the presence of pedestrians in Risk Zones, for triggering auditory, vibrational and visual alarms to the bus driver.

The invention disclosed herein improves existing passenger safety systems, primarily by adding an extra level of monitoring and notification for the bus driver during the departure and acceleration after a bus stop. The primary improvements include:
  1. after closing the boarding door, continuing the functioning of the boarding-side floodlights, and cameras transmitting images of the boarding side of the bus to respective portions of a split-screen monitor viewable by the bus driver;
  2. door-closing activation of motion sensors on all four sides of the bus (or at least on the front and passenger sides), to detect any person approaching the departing bus;
  3. door-closing activation of a timer, deactivating all motion sensors and floodlights and cameras at the expiration of a predetermined duration (such as 15 seconds);
  4. during which time the sensing of an approaching person will trigger a pedestrian-specific sound alarm, vibrational alarm in the driver's seat, and flashing visual alarm on the monitor (along with an image captured by the camera).

BRIEF DESCRIPTION OF THE DRAWINGS

The novel features believed characteristic of the disclosed subject matter will be set forth in any claims that are filed later. The disclosed subject matter itself, however, as well as a preferred mode of use, further objectives, and advantages thereof, will best be understood by reference to the following detailed description of an illustrative embodiment when read in conjunction with the accompanying drawings.

These drawings illustrate certain details of certain embodiments. However, the invention disclosed herein is not limited to only the embodiments so illustrated. The invention disclosed herein may have equally effective or legally equivalent embodiments.

DETAILED DESCRIPTION OF THE INVENTION

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising", or "includes" and/or "including", or "have" or "having", when used in this specification, specify the presence of stated features, regions, integers, steps, operations, elements and/or components, but do not preclude the presence or addition of one or more other features, regions, integers, steps, operations, elements, components and/or groups thereof.

For the sake of simplicity and to give the claims of this patent application the broadest interpretation and construction possible, the conjunctive "and" may also be taken to include the disjunctive "or," and vice versa, whenever necessary to give the claims of this patent application the broadest interpretation and construction possible with sufficient definiteness to support patentability. Likewise, when the plural form is used, it may be taken to include the singular form, and vice versa.

It will be understood that, although the terms "first", "second", "third", etc. may be used herein to describe various elements, these elements should not be limited by these terms. These terms are only used to distinguish one element from another element. Additionally, if the context indicates, a term such as "first" (etc.) may indicate the positioning of the element(s) on a "first" side of the vehicle. For example, the "first motion sensor" is located on the side of the vehicle wherein the first risk zone is located, and more than one such motion sensor may be located on that side of the vehicle; but the context of the claims is not intended to indicate that the "first vibration generator" is located on that side of the vehicle.

Synonyms for the same element, term or concept may be used only to distinguish one similar element from another, unless the context clearly indicates otherwise.

One primary feature of the disclosed system is the coordination of the activation and de-activation of the motion sensor(s), and the corresponding coordination of the stimuli produced by the sensing of pedestrian motion, One primary purpose is to alert the driver of the location of any student running to "catch" (and board) the bus after the boarding door has closed.

Figure 1:
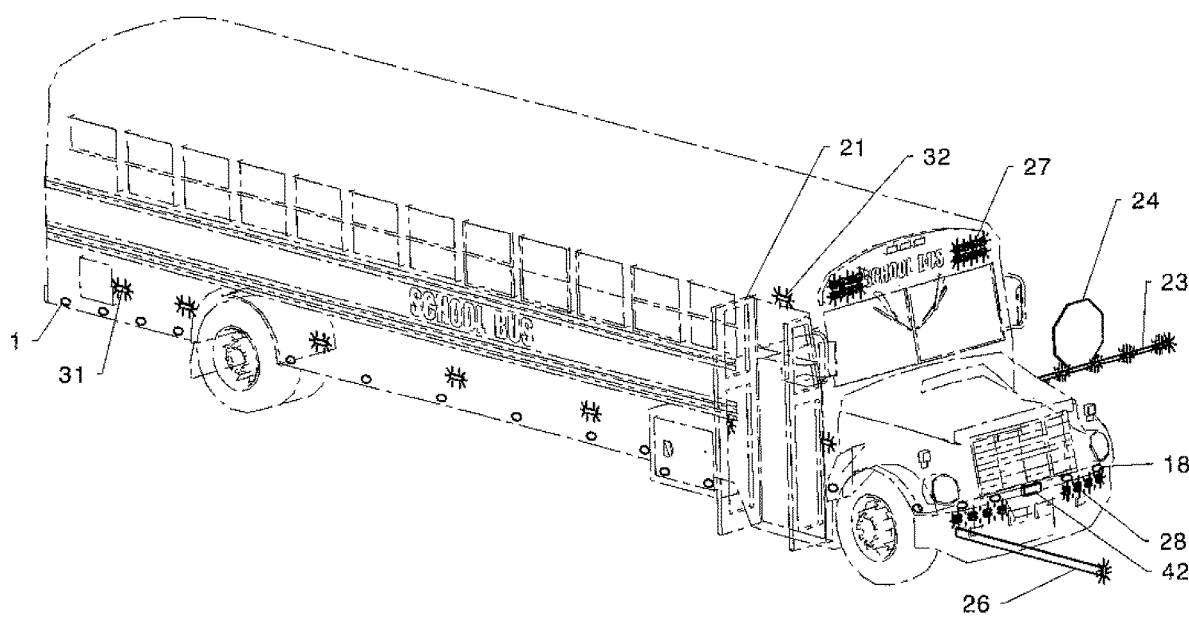
FIG. 1 is a perspective view from the front and passenger side of a representative sample of a bus including the external warning apparati of one embodiment of the warning system disclosed herein, configured as if the bus is in a stopped resting position awaiting boarding during low-light conditions.
Figure 3:
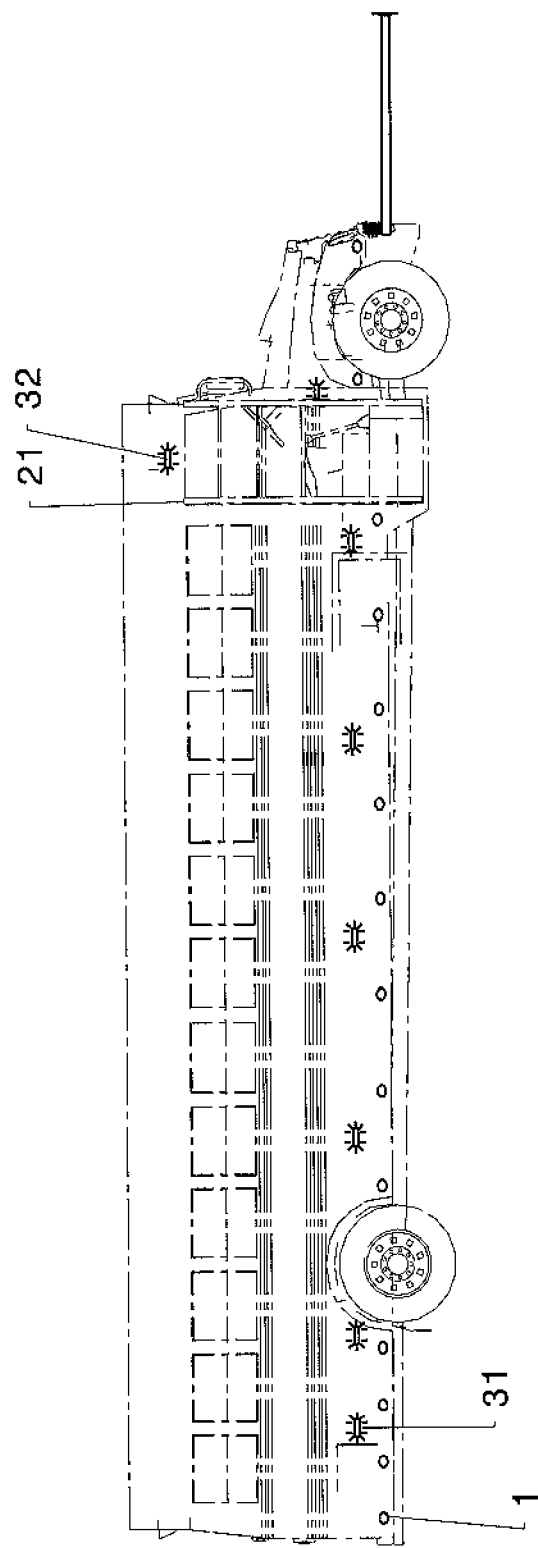
FIG. 3 is an elevation view of the passenger side of the bus of FIG. 1.

In one preferred embodiment, a plurality of motion sensors are installed on the vehicle approximately 28 inches above the pavement. This height typically allows motion sensing for all individuals, especially students having a height typically found in kindergarten through twelfth grade. There are 12 sensors on the passenger/boarding side of the bus, spaced periodically from the rear end of the bus (sensor (1) in FIGS. 1 and 3) to the boarding door (21). An additional 6 sensors may be mounted and spaced appropriately from the front corner of the bus nearest the driver (sensor (18) in FIG. 1) and extending around the front right corner to the boarding door. The detection range or radius for the sensors may be approximately in the range of between about 48 inches to about 54 inches. The motion sensors are activated automatically when boarding door closes.

The motion sensors on the passenger/boarding side may have a different visual and audio alarm than that of the front side motion sensors. This different visual and audio alarm will alert the bus driver immediately on which side the student is located and allows the bus to stop the forward motion and prevent injury to the student.

Preferably, the actual time the motion sensors are operating is 10 to 20 seconds. When the bus driver leaves the bus stop, after boarding students from an area, the driver's attention is straight ahead on roadway. If a student misses the bus, then it is not unusual for the student to run after the bus while the bus is in forward motion. This is where many deadly accidents occur, whether it is pre-dawn or daylight. Motion sensors are automatically activated when the bus door is closed. At the expiration of the predetermined duration (15 seconds, for example) an automatic timer shuts off the motion sensors, cameras and monitor, and any safety lighting deployed by the driver.

When the boarding door opens for students to board the bus, the electrical circuitry supplying power is broken, and the timer returns to its starting point to await re-activation by re-closing of the boarding door. The motion sensors will shut off automatically upon expiration of the predetermined duration of the timer. This activation and de-activation process occurs each time the boarding door is closed and opened during operation of the bus.

The power source for the motion sensors, timer, video camera, monitor, vibration generators and sound generators comes from the bus ignition start and stop switch. Constant power is available to these components while the bus ignition is operating, once the key is inserted into the ignition and turned on. This avoids human error, by not requiring the bus driver to have to remember to activate these components. Turning the bus off and removing the key cuts the power to these components.

In one embodiment, the driver is unable to change the predetermined duration of the timer either. For example, only the bus mechanic may change the duration of the timer.

Figure 2:
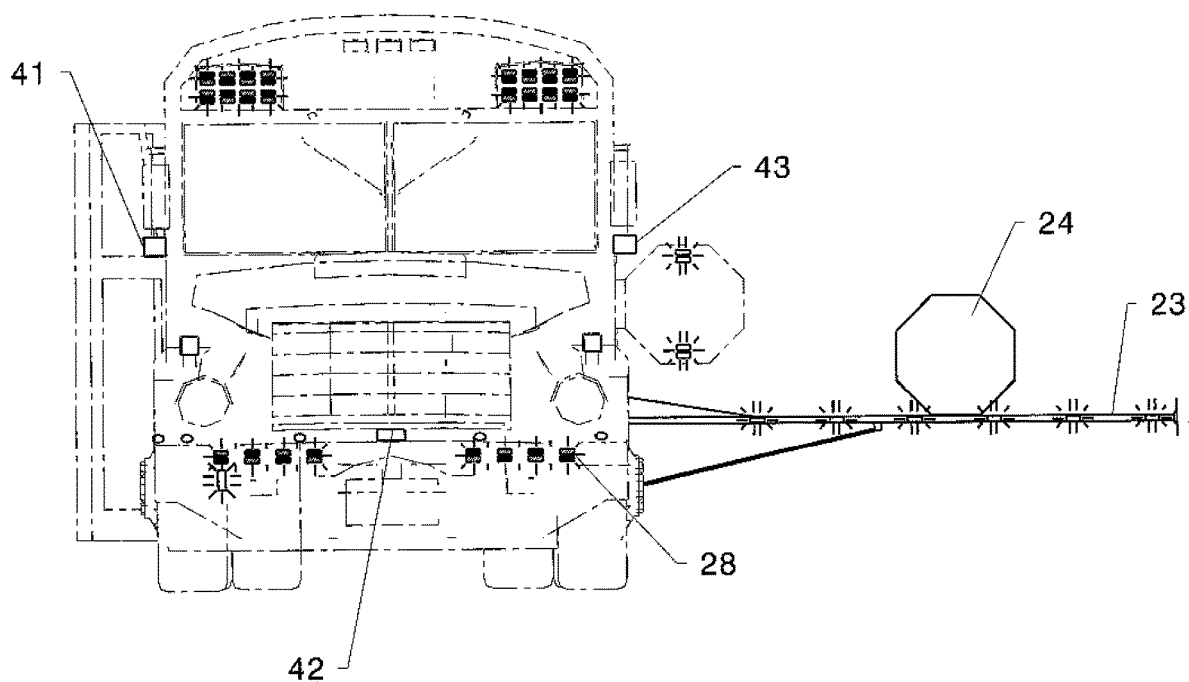
FIG. 2 is an elevation view of the front of the bus of FIG. 1.
Figure 4:
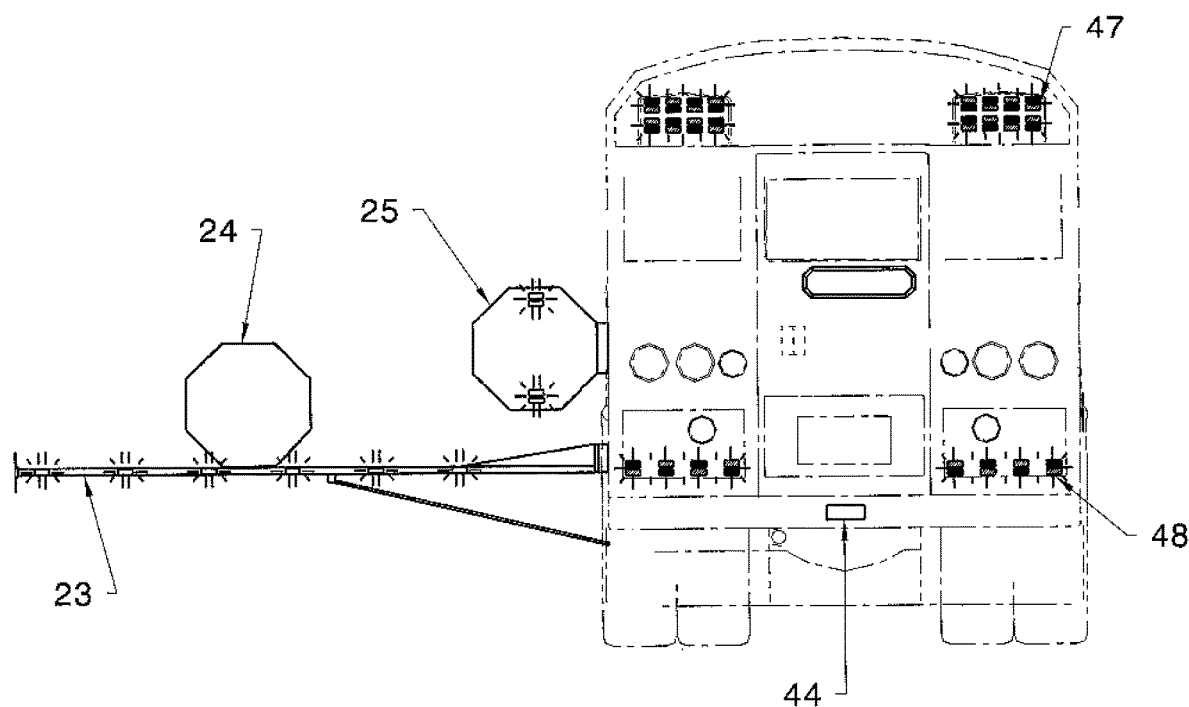
FIG. 4 is an elevation view of the front side of the bus of FIG. 1.
Figure 5:
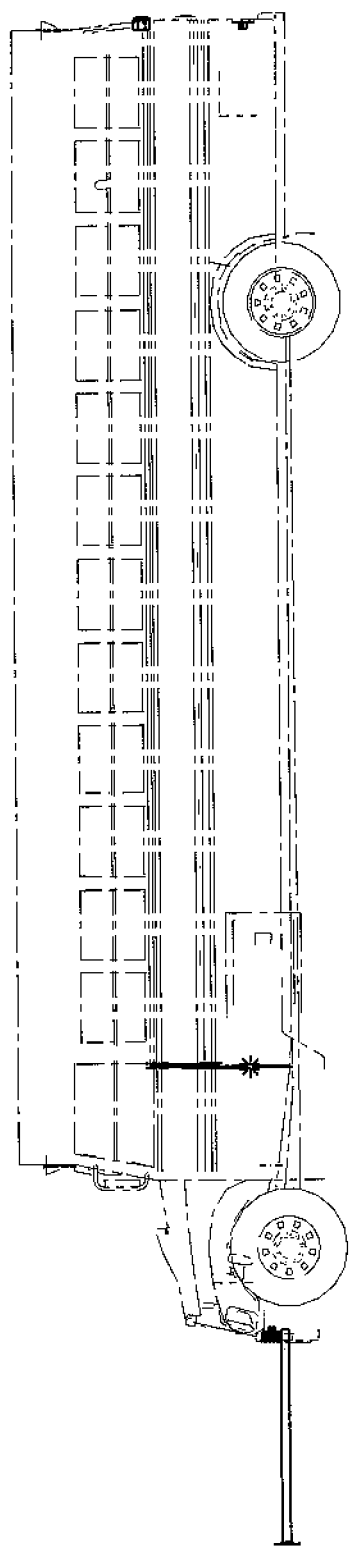
FIG. 5 is an elevation view of the driver's side of the bus of FIG. 1.
Figure 6:
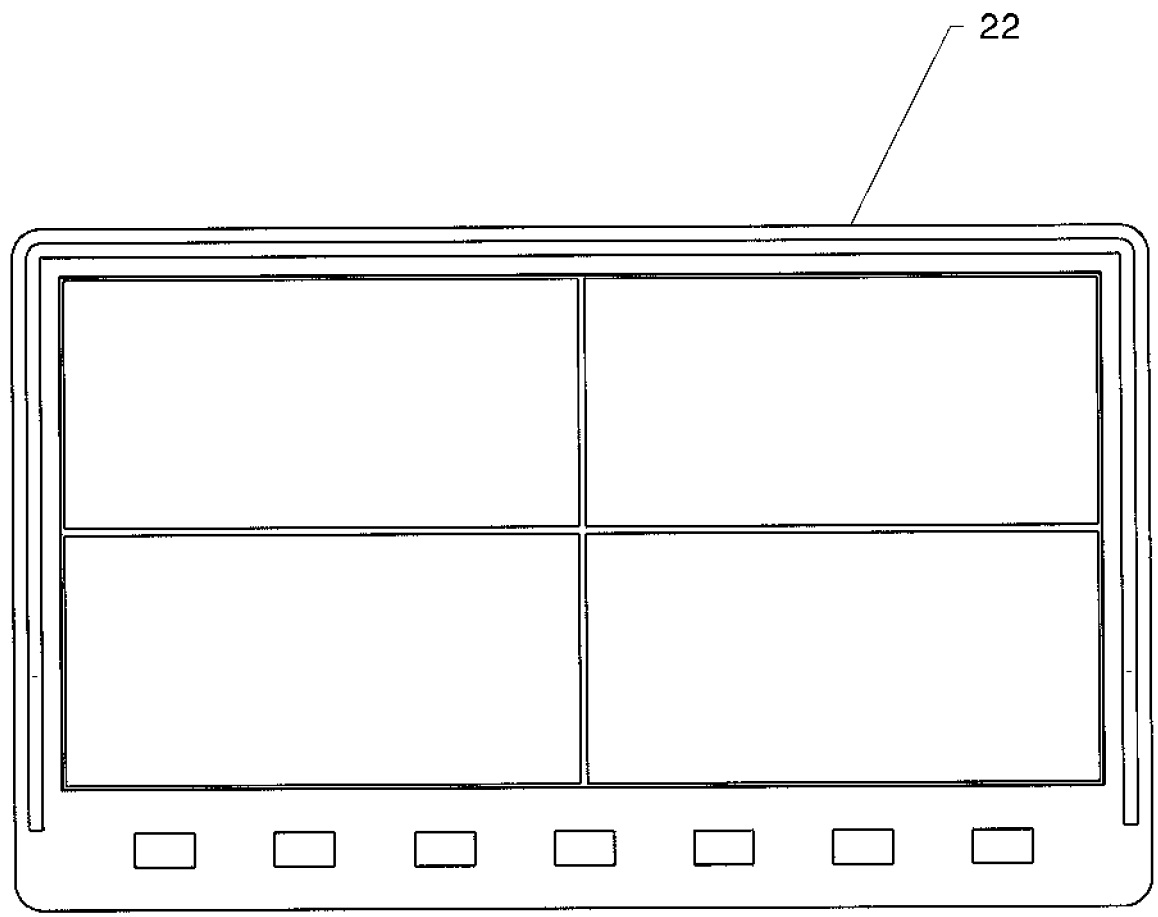
FIG. 6 is a front elevation view of a representative sample of a split-screen video monitor readily viewable from the driver's seat of the bus of FIG. 1, showing four quadrants for displaying images captured and transmitted by four video cameras at a time when no motion is detected by any of the motion sensors on any of the sides of the bus.
Figure 7:
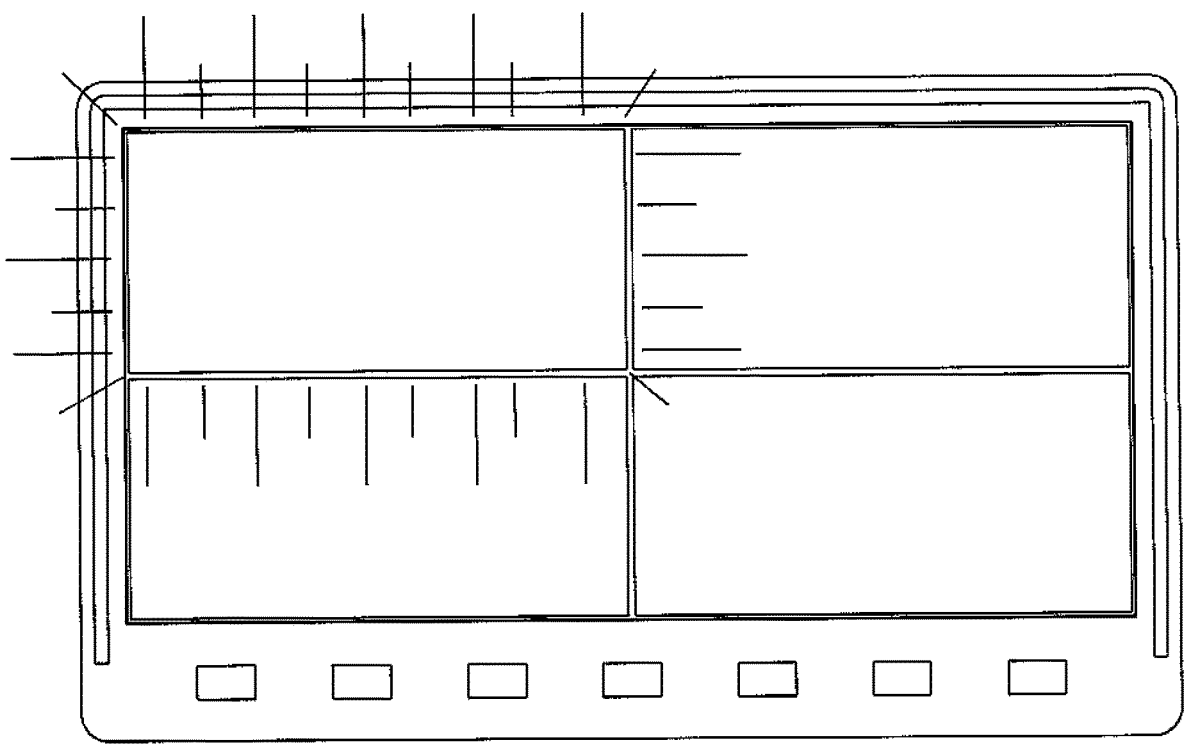
FIG. 7 is the monitor of FIG. 6, but having a flashing margin of the top left quadrant, warning of motion sensed in the front of the bus.

The system includes at least one camera or similar image transmitting device, preferably capable of capturing images in low-light conditions. More preferably, the system includes a separate video camera on each side of the vehicle, transmitting images from all sides to a split-screen monitor readily viewable by the driver during times when the cameras are activated. For example, the camera for monitoring the passenger boarding side of the bus may be situated near the passenger boarding door (rearward of the boarding door), directed rearward; alternatively, the camera may be mounted on the passenger side of the bus near the rear corner, directed forward. The camera monitoring the front of the bus may be mounted on or within the front bumper, as is (42) of FIG. 2. The camera monitoring the driver's side of the bus may be situated below or near the driver's window, directed rearward; alternatively, the camera may be mounted on the driver side of the bus near the rear corner, directed forward. The camera monitoring the rear of the bus may be mounted on or within the rear bumper, as is (44) of FIG. 4.

In one embodiment, for a driver sitting in the driver's seat facing forward, there is a 10-inch monitor (22) located to the right side of the console directly in front of the driver or diagonally to the right. The monitor displays images from 4 cameras/channels, on a screen split into quadrants to facilitate the driver distinguishing between the images. For example, the images of the first risk zone (the boarding door and the boarding side of the bus) will appear on the top left quadrant, the images of the second risk zone (the front of the bus, toward the front right corner of the bus) will appear on the top left quadrant, the images of the third risk zone (the driver's side of the bus) will appear on the bottom left quadrant, and the images of the fourth risk zone (the rear of the bus) will appear on the bottom right quadrant. This arrangement allows the driver to watch the boarding passengers boarding while he or she continues to monitor 360 degrees around the bus for danger.

In one embodiment, the cameras and monitor can be operated independently from the motion detection components of the system that are typically activated only after the boarding door is closed. For example, such independent operation may be facilitated when the master switch is turned off, by using a 3-position toggle or rocker switch, double pole double throw auto on-off-on manual. Many buses already have a master switch to activate (or allow activation of) standard features such as lighting and pivoting stop signs. The security system disclosed herein may include a 3-position auxiliary switch with, for example: Position A (up) adding the video camera(s), the motion sensor(s), the video monitor, the sound generator(s), and the vibration generator(s) to operation with master switch; Position B (middle) disengaging the auxiliary items from the master switch; and Position C (bottom) activating (or allowing activation of) the video camera(s), the motion sensor(s), the video monitor(s), the sound generator(s), and the vibration generator(s) even though the master switch is off.

In one embodiment, the cameras and monitor begin operating when the boarding door opens to allow boarding. In another embodiment, the cameras and monitor begin operating only after the boarding door closes (when the motion sensors and timer begin operating). In another embodiment, the driver's election to deploy additional lighting will commence operation of the camera and monitor. Typically the camera(s) transmit images to the monitor for the predetermined duration, for example for 10-20 seconds after the boarding door is closed, after which there is automatically shut-off by expiration of the timer.

One primary feature of the disclosed system is a generator of vibrational or other tactile output ("vibration generators") for perception by the driver, to alert the driver that a pedestrian is approaching the bus after the boarding door is closed. Due to excessive noise and possibly visual distractions in the bus during this time, it is useful to provide the driver's seat with vibration generators, especially vibration generators activated by stimulation received from a motion sensor detecting a pedestrian moving within the boarding-side risk zone or the second/front risk zone. Although the vehicle's warning system may also have visual and/or audio output available, those may not be enough to get the attention of the driver. Having tactile output, in addition to visual and/or auditory output, greatly improves the warning system when a pedestrian is moving within a risk zone after the boarding door is closed. This added level of safety ensures that the pedestrian will be detected despite any concurrent noise or visual distractions within the vehicle.

The driver's seat may have a different vibration generator (not shown) for each motion sensor within each respective risk zone. For example, a first vibrational generator may be located in or on the right-side edge of the seat platform (from the perspective of sitting in the driver's seat facing forward), stimulated by pedestrian movement in the boarding-side risk zone. A second vibration generator may be located in or on the forward-side edge of the seat platform, stimulated by pedestrian movement in the front-side risk zone. A third vibration generator may be located in or on the right-side edge of the seat platform, stimulated by pedestrian movement in the driver-side risk zone, and a fourth vibration generator may be located in the rear-side edge of the seat platform, stimulated by pedestrian movement in the rear risk zone. Output from each can readily allow the driver to discern which risk zone(s) have pedestrians therein after the boarding door is closed.

In one embodiment, motion sensing within a risk zone will stimulate vibrational, visual and auditory output simultaneously, so that the driver will perceive a seat vibration and a flashing on the monitor and an auditory alarm.

In another embodiment, bus drivers may manually activate yellow warning lights before actual bus stops, by pushing a button switch while approaching the bus stop or other boarding zone. When the driver activates such lights, the boarding lights may automatically turn on as well. This helps the bus driver to better see while approaching bus stop. Ideally the boarding-side lights (other than the boarding door light, 32) will be mounted below the eye level of the driver, to avoid glare and facilitate better visibility. The boarding lights also help students to see the entire bus passenger side while approaching in pre-dawn darkness or any weather condition that limits vision for both bus driver and student. All such additional lights remain activated for the predetermined duration of the timer.

In general, the invention disclosed herein comprises (includes) a system warning the driver of a mass transit vehicle that at least one pedestrian is within an injury risk zone adjacent the mass transit vehicle. The system may include at least one first vibration generator in or on the driver's seat of the mass transit vehicle, in functional relationship with at least one first motion sensor and an associated timer allowing motion sensing toward the vehicle for a predetermined duration. Typically, the motion sensors detect pedestrian movement toward the vehicle, in an injury risk zone; however, any pedestrian movement posing risk of injury may be targeted by the motion sensor(s). The first motion sensor and timer may be activated by each closure of a boarding door of the vehicle, to commence the motion sensing for the predetermined duration. Any pedestrian motion toward the vehicle sensed by the first motion sensor within a first risk zone adjacent the vehicle stimulates the first vibration generator to generate a first tactile signaling output perceptible by the driver sitting on the driver's seat for notification of the pedestrian motion in the first risk zone.

Each opening of the boarding door may also re-set the timer to await activation by a closure of the boarding door.

The alternative functional equivalent is the closure of the boarding door causing the commencement of the timer duration, regardless of whether it technically is re-set before commencement.

The opening of the boarding door may also activate at least one first video camera transmitting images of the first risk zone to a monitor readily perceptible by the driver sitting in the driver's seat, and/or activate at least one first flood light mounted on the vehicle, to illuminate the first risk zone.

Auxiliary warning is provided to the bus driver when any such pedestrian motion sensed by the first motion sensor within a first risk zone causes the first motion sensor to also transmit:
  (a) a first visual warning stimulus to the monitor for output readily perceptible from the driver's seat; and/or
  (b) a first auditory alarm stimulus to the first sound generator for output readily perceptible from the driver's seat. Besides the utility of the vibrational notification, the combination of that vibrational notification and one or both of the visual and auditory notification(s) greatly enhances the utility.

The first risk zone may include the boarding door and nearby boarding area alongside the vehicle. The system further may include at least one second vibration generator in or on the driver's seat such as, for example, in a location distinguishable from that of the first vibration generator. The system may also include at least one second motion sensor allowing motion sensing toward the vehicle for the predetermined duration, the second motion sensor also activated by each closure of the boarding door to commence motion sensing toward the vehicle for the predetermined duration. In this embodiment of the invention, any pedestrian motion toward the vehicle sensed by the second motion sensor within a second risk zone including the front of the vehicle stimulates the second vibration generator to generate a second tactile signaling output perceptible by the driver sitting on the driver's seat for notification of the pedestrian motion in the second risk zone.

The opening of the boarding door may also activate:
  (a) at least one second flood light mounted on the vehicle, to illuminate the second risk zone; and/or
  (b) at least one second video camera transmitting images of the second risk zone to a portion of the monitor distinguishable from the first risk zone images. Any such sensed pedestrian motion in the second risk zone may cause the second motion sensor to also transmit:
    (1) a second visual warning stimulus to the monitor for output readily perceptible from the driver's seat; and/or
    (2) a second auditory alarm stimulus to a second sound generator for output readily perceptible from the driver's seat. Ideally, the second tactile signaling output is readily distinguishable from the first tactile signaling output; and the second visual warning output is readily distinguishable from the first visual warning output; and the second auditory alarm output is readily distinguishable from the first auditory alarm output. Ideally, the driver can quickly discern where the potential danger to a pedestrian is located, by the notification(s) received.

The various notifications/outputs can vary as to the nature of the signal (such as different colors of visible flashing, or the tone of auditory output), the strength of the signal (such as the amplitude of vibration, the brightness of flashing or the loudness of the sound), the frequency of repetition, or the location (such as the location(s) of the vibration generator(s) on the driver's seat, the location on the monitor of flashing, or location of speakers for the sound). In one embodiment, the first sound alarm output may include a periodic beeping sound, and/or the first visual warning output may include a flashing on the applicable portion of the monitor, and/or the first tactile signaling output may include a vibration of sufficient strength to be felt by the driver sitting thereon in thick clothing. The counterpart second outputs should differ from each of the respective first outputs in some manner facilitating quick distinguishing of outputs.

Another embodiment of the system may further may include a central switch for activation, at the option of the driver, of:
  (a) at least one first flood light (32) mounted on the vehicle, to illuminate the boarding door and/or nearby boarding area along the vehicle; and/or
  (b) at least one second flood light mounted on the vehicle, to illuminate the second risk zone; and/or
  (c) a plurality of second flashable warning lights mounted on the front of the vehicle (27, upper left and/or right sides; and/or 28, lower left and/or right sides); and/or
  (d) a plurality of rear flashable warning lights mounted on the rear of the vehicle (47, upper left and/or right sides; and/or 48, lower left and/or right sides).

After the driver has caused the central switch to activate the light(s), expiration of the predetermined duration deactivates the light(s).

The closure of the boarding door may also activate a first video camera transmitting images of the first risk zone to a monitor readily perceptible by the driver sitting in the driver's seat.

One particular embodiment of the warning system may include:
  (a) at least one first video camera transmitting images of a first risk zone along a boarding side of the vehicle to a monitor readily viewable from the driver's seat, both activated by each opening of a boarding door;
  (b) at least one first vibration generator in or on the driver's seat of the vehicle; and
  (c) at least one first motion sensor mounted along the boarding side, and an associated timer allowing motion sensing in the first risk zone toward the vehicle for a predetermined duration, the first motion sensor and timer activated by each closure of the boarding door to commence motion sensing toward the vehicle for the predetermined duration, wherein any such pedestrian motion sensed by the first motion sensor stimulates the first vibration generator to generate a first tactile signaling output perceptible by the driver sitting on the driver's seat, and stimulates transmission of a first visual warning stimulus to the monitor and/or a first auditory alarm stimulus to a first sound generator for visual and/or auditory output(s) readily perceptible by the driver.

The system further may include:
  (a) at least one second video camera, also activated by opening of the boarding door, transmitting images of a second risk zone along a front side of the vehicle to a portion of the monitor distinguishable from the first risk zone images;
  (b) at least one second vibration generator in or on the driver's seat in a location distinguishable from the first vibration generator; and
  (c) at least one second motion sensor, also activated by closure of the boarding door and governed by the timer to allow motion sensing for the predetermined duration, wherein any such pedestrian motion sensed by the second motion sensor stimulates the second vibration generator to generate a second tactile signaling output distinguishable from the first tactile signaling output, and stimulates transmission of a second visual warning stimulus to the monitor and/or a second auditory alarm stimulus to a second sound generator, for second visual and/or auditory output(s) distinguishable from the first visual and/or auditory output(s).

The opening of the boarding door:
(a) sets the timer to await activation by a closure of the boarding door; and/or
(b) activates at least one first flood light to illuminate the first risk zone; and/or
(c) activates at least one second flood light to illuminate the second risk zone; and/or
(d) activates at least one third flood light to illuminate a third risk zone along the driver's side of the vehicle, and/or activates at least one third video camera transmitting third risk zone images to a portion of the monitor distinguishable from any other risk zone images.

The system further may include:
(a) at least one third vibration generator in or on the driver's seat in a location distinguishable from the other vibration generators; and
(b) at least one third motion sensor, also activated by closure of the boarding door and governed by the timer to allow motion sensing in the third risk zone toward the vehicle for the predetermined duration, wherein any such pedestrian motion sensed by the third motion sensor stimulates the third vibration generator to generate a third tactile signaling output distinguishable from the first and second tactile signaling outputs, and stimulates transmission of a third visual warning stimulus to the monitor and/or a third auditory alarm stimulus to a third sound generator, for third visual and/or auditory output(s) distinguishable from the first and second visual and/or auditory output(s).

The system further may include a central switch for activation, at the option of the driver, of:
(a) at least one first flood light mounted on the vehicle, to illuminate the boarding door and/or nearby boarding area along the vehicle; and/or
(b) at least one second flood light mounted on the vehicle, to illuminate the second risk zone; and/or
(c) at least one second flood light mounted on the vehicle, to illuminate the second risk zone; and/or
(d) a plurality of second flashable warning lights mounted on the front of the vehicle; and/or
(e) a plurality of rear flashable warning lights mounted on the rear of the vehicle.

Besides the system of apparati described herein, the invention includes a method of using a system warning the driver of a mass transit vehicle that at least one pedestrian is within an injury risk zone adjacent the mass transit vehicle. For example, the method may include the steps of:
(a) enabling the warning system by (for example) positioning a toggle switch (or other enabling switch) in a position other than "off";
(b) opening a boarding door of the vehicle for passenger onboarding, thereby setting the timer and motion sensor to await activation by closure of the boarding door, the opening of the boarding door also activating at least one first video camera transmitting first risk zone images to the monitor readily viewable by a driver sitting in the driver' seat, the opening also activating any flood light necessary for discernable first risk zone images; and
(c) closing the boarding door when boarding is complete, thereby activating the timer and motion sensor to sense pedestrian motion within the first risk zone for the predetermined duration; wherein
(d) if the pedestrian motion is sensed, perceiving the first vibrational signaling output stimulated by the pedestrian motion, together with the first visual warning output and/or the first auditory alarm output stimulated by the pedestrian motion.

Since various modifications can be made in my invention as herein above described, and many apparently widely different embodiments of same made, it is intended that all matter contained in the accompanying specification shall be interpreted as illustrative only and not in a limiting sense.

Although several embodiments of the present disclosure have been shown and described, it should be appreciated by those having ordinary skill in the art that changes may be made in these embodiments without departing from the principles and spirit of the disclosure, the scope of which is defined in the claims and their equivalents. The scope of the disclosed subject matter is defined by the appended claims and includes both combinations and sub combinations of the various features described hereinabove as well as variations and modifications thereof, which would occur to persons skilled in the art upon reading the foregoing description.

I claim:

1. A system warning a driver of a bus that at least one pedestrian is within an injury risk zone adjacent the bus, the system comprising:
(a) at least one first video camera transmitting images of a first risk zone along a boarding side of the bus to a monitor readily viewable from the driver's seat, the first video camera and the monitor activated by each opening of a boarding door;
(b) at least one first vibration generator in or on the driver's seat of the bus; and
(c) at least one first motion sensor mounted along the boarding side, and an associated timer allowing motion sensing in the first risk zone towards the bus for a predetermined duration, the first motion sensor and the timer activated by each closure of the boarding door to commence motion sensing towards the bus for the predetermined duration, wherein the pedestrian motion sensed by the first motion sensor during the predetermine duration stimulates the first vibration generator to generate a first tactile signaling output perceptible by the driver sitting on the driver's seat, and stimulates transmission of a first visual warning output to the monitor and/or a first auditory alarm stimulus to a first sound generator for visual and/or auditory output readily perceptible by the driver, during a stop or departure of the bus.

2. A system described in claim 1, further comprising:
(a) at least one second video camera, also activated by opening of the boarding door, transmitting images of a second risk zone along a front side of the bus to a portion of the monitor distinguishable from the first risk zone images;
(b) at least one second vibration generator in or on the driver's seat in a location distinguishable from the first vibration generator; and
(c) at least one second motion sensor, also activated by closure of the boarding door and governed by the timer to allow motion sensing for the predetermined duration, wherein the pedestrian motion sensed by the second motion sensor stimulates the second vibration generator to generate a second tactile signaling output distinguishable from the first tactile signaling output, and stimulates transmission of a second visual warning stimulus to the monitor and/or a second auditory alarm stimulus to a second sound generator, for second visual and/or auditory output(s) distinguishable from the first visual and/or auditory output(s).

3. A system described in claim 2, wherein the opening of the boarding door:
   (a) sets the timer to await activation by a closure of the boarding door; and/or
   (b) activates at least one first flood light to illuminate the first risk zone; and/or
   (c) activates at least one second flood light to illuminate the second risk zone; and/or
   (d) activates at least one third flood light to illuminate a third risk zone along the driver's side of the bus, and/or activates at least one third video camera transmitting third risk zone images to a portion of the monitor distinguishable from any other risk zone images.

4. A system described in claim 3, further comprising:
   (a) at least one third vibration generator in or on the driver's seat in a location distinguishable from the other vibration generators; and
   (b) at least one third motion sensor, also activated by closure of the boarding door and governed by the timer to allow motion sensing in a third risk zone toward the bus for the predetermined duration, wherein any such pedestrian motion sensed by the third motion sensor stimulates the third vibration generator to generate a third tactile signaling output distinguishable from the first and second tactile signaling outputs, and stimulates transmission of a third visual warning stimulus to the monitor and/or a third auditory alarm stimulus to a third sound generator, for third visual and/or auditory output(s) distinguishable from the first and second visual and/or auditory output(s).

5. A system described in claim 1, further comprising a central switch for activation, at the option of the driver, of:
   (a) at least one first flood light mounted on the vehicle, to illuminate the boarding door and/or nearby boarding area along the bus; and/or
   (b) at least one second flood light mounted on the bus, to illuminate the second risk zone; and/or
   (c) at least one second flood light mounted on the bus, to illuminate the second risk zone; and/or
   (d) a plurality of second flashable warning lights mounted on the front of the bus; and/or
   (e) a plurality of rear flashable warning lights mounted on the rear of the bus.

6. A method of using the system warning the driver of the bus that the at least one pedestrian is within the injury risk zone adjacent the bus, described in claim 1 hereinabove, comprising the steps of:
   (a) enabling the system;
   (b) opening the boarding door of the bus for passengers onboarding, thereby setting the timer and the motion sensor to await activation by closure of the boarding door, the opening of the boarding door also activating at least one first video camera transmitting first risk zone images to the monitor readily viewable by the driver sitting in the driver'seat; and
   (c) closing the boarding door when boarding is complete, thereby activating the timer and motion sensor to sense the pedestrian motion within the first risk zone for the predetermined duration.

\* \* \* \* \*